US012325232B2

(12) United States Patent
Yoda et al.

(10) Patent No.: US 12,325,232 B2
(45) Date of Patent: Jun. 10, 2025

(54) RECORDING DEVICE AND CONTROL METHOD FOR RECORDING DEVICE

(71) Applicant: SEIKO EPSON CORPORATION, Tokyo (JP)

(72) Inventors: Tomohiro Yoda, Matsumoto (JP); Shinya Yamazaki, Higashichikuma-Gun Asahi-mura (JP)

(73) Assignee: Seiko Epson Corporation, Tokyo (JP)

( * ) Notice: Subject to any disclaimer, the term of this patent is extended or adjusted under 35 U.S.C. 154(b) by 173 days.

(21) Appl. No.: 18/158,153

(22) Filed: Jan. 23, 2023

(65) Prior Publication Data

US 2023/0234382 A1 Jul. 27, 2023

(30) Foreign Application Priority Data

Jan. 24, 2022 (JP) ................................ 2022-008720

(51) Int. Cl.

*B41J 13/02* (2006.01)
*B41J 13/00* (2006.01)
*B41J 15/16* (2006.01)

(52) U.S. Cl.

CPC ........... *B41J 13/02* (2013.01); *B41J 13/0009* (2013.01); *B41J 15/16* (2013.01)

(58) Field of Classification Search

CPC ........ B41J 13/02; B41J 13/0009; B41J 15/16; G03G 21/1695; G03G 2215/00679

See application file for complete search history.

(56) References Cited

U.S. PATENT DOCUMENTS

2009/0194631 A1* 8/2009 Genta .................. B65H 75/246 242/576
2018/0222231 A1* 8/2018 Liu ...................... B41J 13/0009
2019/0171135 A1* 6/2019 Ota ...................... G03G 15/205

FOREIGN PATENT DOCUMENTS

JP 2012-224413 A 11/2012

* cited by examiner

*Primary Examiner* — Jason S Uhlenhake

(74) *Attorney, Agent, or Firm* — WORKMAN NYDEGGER

(57) ABSTRACT

A recording device includes a holding part that holds a roll body of a recording medium, a rotation mechanism that rotates the roll body, a pair of transport rollers that transport the recording medium by nipping and rotating the recording medium, a recording part that performs recording on the transported recording medium, a first detection part that detects a leading end of the recording medium, and a notification part that notifies information, wherein whether or not the leading end is detected by the first detection part is monitored in a first monitoring operation in a state in which nipping by the pair of transport rollers is released, and when the leading end has been detected by the first detection part, a first notification operation of causing the notification part to notify that the leading end has been detected by the first detection part is performed.

8 Claims, 7 Drawing Sheets

RECORDING DEVICE AND CONTROL METHOD FOR RECORDING DEVICE

The present application is based on, and claims priority from JP Application Serial Number 2022-008720, filed Jan. 24, 2022, the disclosure of which is hereby incorporated by reference herein in its entirety.

BACKGROUND

1. Technical Field

The present disclosure relates to a recording device and a control method for a recording device.

2. Related Art

Typically, various recording devices have been used. Among recording devices, there is a recording device in which a roll body in which a recording medium is wound into a roll shape can be set and recording can be performed on the recording medium. For example, JP-A-2012-224413 discloses an image forming device in which roll paper in which paper is wound into a roll shape can be set and recording can be performed on the roll paper.

In a recording device such as the image forming device disclosed in JP-A-2012-224413, in which a roll body in which a recording medium is wound in a roll shape is set and recording is performed on the recording medium, the transported recording medium may be transported while being skewed. Therefore, in the image forming device disclosed in JP-A-2012-224413, a position of an end portion of the paper is detected while the paper is being transported, skew transport is detected from a displacement of the detected position, and a back tension is adjusted according to an amount of skew. However, in many cases, skew transport of the recording medium is caused by a setting method of the roll body, and JP-A-2012-224413 does not describe a setting method of a roll body that curbs skew transport when the roll body is set, what is called a skew removal at the time of setting of a roll body. In addition, in a recording device in which a roll body can be set on one side in a back and forth direction of a typical recording device, and recording can be performed on a recording medium of the roll body, and the recording medium can be discharged from the other side in the back and forth directions, in most cases, the user is forced to reciprocate the recording device back and forth many times when the roll body is set, there is a risk of damage to the recording medium, and skew removal accuracy is low. Therefore, it is desired to remove a skew easily and with high accuracy without damaging the recording medium.

SUMMARY

A recording device according to the present disclosure to solve the above problems includes a holding part that holds a roll body in which a recording medium is wound into a roll shape, a rotation mechanism that rotates the roll body by rotating the holding part, a pair of transport rollers that transport the recording medium by nipping and rotating the recording medium, a recording part that performs recording on the recording medium transported by the pair of transport rollers, a first detection part that is disposed downstream of the recording part in a transport direction of the recording medium and detects a leading end of the recording medium in the transport direction, a notification part that notifies information, and a control part that controls the rotation mechanism, the pair of transport rollers, the recording part, the first detection part, and the notification part, wherein in a state in which nipping by the pair of transport rollers is released, the control part monitors in a first monitoring operation whether or not the leading end inserted in the transport direction from the holding part side into a space between the pair of transport rollers is detected by the first detection part, and when the leading end is detected by the first detection part, the control part performs a first notification operation of causing the notification part to notify that the leading end is detected by the first detection part.

In addition, a control method for a recording device according to the present disclosure to solve the above problem is a control method for a recording device which includes a holding part that holds a roll body in which a recording medium is wound into a roll shape, a rotation mechanism that rotates the roll body by rotating the holding part, a pair of transport rollers that transport the recording medium by nipping and rotating the recording medium, a recording part that performs recording on the recording medium transported by the pair of transport rollers, a first detection part that is disposed downstream of the recording part in a transport direction of the recording medium and detects a leading end of the recording medium in the transport direction, and a notification part that notifies information. The method includes, in a state in which nipping by the pair of transport rollers is released, monitoring in a first monitoring operation whether or not the leading end inserted in the transport direction from the holding part side into a space between the pair of transport rollers is detected by the first detection part, and when the leading end is detected by the first detection part, performing a first notification operation of causing the notification part to notify that the leading end is detected by the first detection part.

DESCRIPTION OF EXEMPLARY EMBODIMENTS

Figure 1:
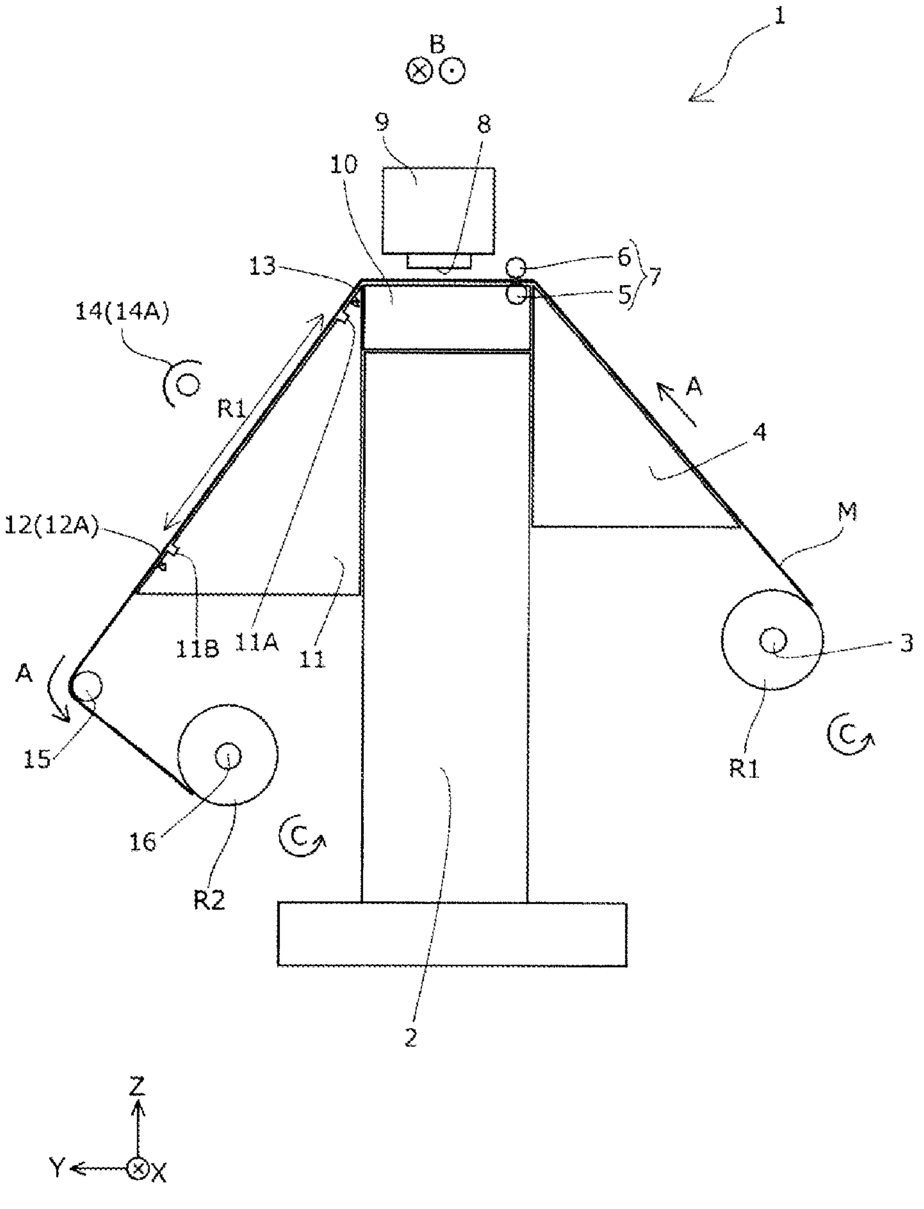
FIG. 1 is a schematic view of a recording device according to Example 1 of the present disclosure.

First, the present disclosure will be schematically described.

A recording device according to a first aspect of the present disclosure for solving the above-described problem includes a holding part that holds a roll body in which a recording medium is wound into a roll shape, a rotation mechanism that rotates the roll body by rotating the holding part, a pair of transport rollers that transport the recording medium by nipping the recording medium and being rotated, a recording part that performs recording on the recording medium transported by the pair of transport rollers, a first detection part that is disposed downstream from the recording part in a transport direction of the recording medium and detects a leading end of the recording medium in the transport direction, a notification part that notifies information, and a control part that controls the rotation mechanism, the pair of transport rollers, the recording part, the first detection part, and the notification part, wherein the control part monitors whether or not the leading end inserted in the transport direction from the holding part side into a space between the pair of transport rollers is detected by the first detection part with a first monitoring operation in a state in which nipping by the pair of transport rollers is released, and performs a first notification operation in which the notification part is caused to notify that the leading end has been detected by the first detection part when the leading end has been detected by the first detection part.

According to the aspect, the first detection part that detects the leading end of the recording medium in the transport direction is provided, in the state in which nipping by the pair of transport rollers is released, whether or not the leading end is detected by the first detection part is monitored with the first monitoring operation, and when the leading end is detected by the first detection part, the notification part is caused to notify that the leading end has been detected by the first detection part. Thus, for example, a user can feed the recording medium from a set position side of the roll body in the state in which the nipping by the pair of transport roller is released, and can stop the feeding of the recording medium at an exact position at which the leading end reaches the first detection part due to the notification of the notification part, and the recording medium can be nipped by the pair of transport rollers while the user is on the set position side of the roll body. When a feeding length of the recording medium is too long, the recording medium may be damaged due to contact with an installation surface of the recording device, or the like. In addition, when the feeding length of the recording medium is too short, skew removal accuracy may decrease. This is because skew removal when the roll body is set is performed by rewinding the recording medium that has been fed once around the roll body, but when a rewinding distance is too short, the skew removal may be insufficient. Further, when the recording medium is repeatedly transported and reversely transported in a state in which the recording medium is nipped by the pair of transport rollers, the recording medium may be damaged. Therefore, while the user is on the set position side of the roll body, the skew can be removed by feeding the recording medium by an appropriate length in the state in which nipping is released, and thus it is possible to remove the skew easily and with high accuracy without damaging the recording medium.

In the first aspect, a recording device according to a second aspect of the present disclosure further includes an operation part that receives an input of an operation, and the control part controls the rotation mechanism to wind the recording medium around the roll body in response to reception of an input of a reverse transport operation that reversely transports the recording medium in a direction opposite to the transport direction from the operation part after the first notification operation is performed.

According to this aspect, after the first notification operation is performed, the recording medium is wound around the roll body in response to receiving the input of the reverse transport operation from the operation part. Thus, it is possible to perform the skew removal in response to receiving the input of the reverse transport operation by the user.

In the second aspect, a recording device according to a third aspect of the present disclosure further includes a second detection part that detects the leading end between the recording part and the first detection part, and the control part is configured to monitor whether or not the leading end is detected by the second detection part with a second monitoring operation, and to end the reverse transport and the winding of the recording medium around the roll body when the leading end is detected by the second detection part.

According to this aspect, the second detection part is provided between the recording part and the first detection part, and the reverse transport and the winding of the recording medium around the roll body is ended when the leading end of the recording medium is detected by the second detection part. Thus, the recording medium in which the skew is removed can be disposed in an appropriate position, and for example, the recording can be immediately started from a desired position on the recording medium.

According to a recording device of a fourth aspect of the present disclosure, in the third aspect, the control part performs a second notification operation in which the notification part is caused to notify that the leading end is detected by the second detection part when the leading end is detected by the second detection part with the second monitoring operation.

According to this aspect, the notification part is caused to notify that the leading end is detected by the second detection part in response to the leading end being detected by the second detection part in the second monitoring operation. Thus, the user can quickly recognize that the recording medium is disposed at an appropriate position.

According to a recording device of a fifth aspect of the present disclosure, in the fourth aspect, the control part performs a third notification operation in which the notification part is caused to notify prompting to nip the recording medium with the pair of transport rollers and to start recording, after the second notification operation is performed.

According to this aspect, after the second notification operation is performed, the notification part is caused to notify the prompting to nip the recording medium with the pair of the transport rollers and to start recording. Thus, the user can quickly start recording.

According to a recording device of a sixth aspect of the present disclosure, in any one of the second to fifth aspects, in a case that the recording medium is not nipped by the pair of transport rollers when the recording starts after the reverse transport of the recording medium, the control part controls the operation part not to receive an input of an operation instruction for starting recording until the recording medium is nipped by the pair of transport rollers.

According to this aspect, in the case in which the recording medium is not nipped by the pair of transport rollers when the recording starts after the reverse transport of the recording medium, the input of the operation instruction for starting recording is not received until the recording medium is nipped by the pair of transport rollers. Therefore, it is possible to curb starting of recording in a state in which the recording medium is not nipped and the recording medium is not being properly transported.

According to a recording device of a seventh aspect of the present disclosure, in the sixth aspect, in the case in which the recording medium is not nipped by the pair of transport rollers when the recording starts after the reverse transport of the recording medium, the control part performs a fourth notification operation in which the notification part is caused to notify prompting of nipping the recording medium with the pair of transport rollers.

According to this aspect, in the case in which the recording medium is not nipped by the pair of transport rollers when recording starts after the reverse transport of the recording medium, the notification part is caused to notify prompting to nip the recording medium with the pair of transport rollers. Thus, the user can quickly recognize a state in which the recording medium is not nipped by the pair of transport rollers and the recording cannot start.

In any one of the first to seventh aspects, a recording device according to an eighth aspect of the present disclosure includes a plurality of the first detection parts in the transport direction, and the control part determines which of the plurality of the first detection parts to be used according to a type of the recording medium.

According to this aspect, the plurality of the first detection part is provided in the transport direction. Thus, the control part can adopt a detection result of the first detection part at an appropriate position according to the ease of skew correction derived from, for example, the type and width of the recording medium, and thus the skew can be removed with high accuracy.

In any one of the first to eighth aspects, a recording device according to a ninth aspect of the present disclosure further includes a heating part that heats the recording medium transported downstream from the recording part in the transport direction, and the first detection part is provided at a position different from a heated region of the recording medium heated by the heating part in the transport direction.

According to this aspect, the heating part that heats the recording medium transported downstream from the recording part in the transport direction is provided, and the first detection part is provided at a position different from the heated region of the recording medium heated by the heating part in the transport direction. Thus, damage to the first detection part by being heated by the heating part can be suppressed.

A control method for a recording device according to a tenth aspect of the present disclosure which includes a holding part that holds a roll body in which a recording medium is wound into a roll shape, a rotation mechanism that rotates the roll body by rotating the holding part, a pair of transport rollers that transport the recording medium by nipping the recording medium and being rotated, a recording part that performs recording on the recording medium transported by the pair of transport rollers, a first detection part that is disposed downstream from the recording part in a transport direction of the recording medium and detects a leading end of the recording medium in the transport direction, and a notification part that notifies information, includes monitoring whether or not the leading end inserted in the transport direction from the holding part side into a space between the pair of transport rollers is detected by the first detection part with a first monitoring operation in a state in which nipping by the pair of transport rollers is released, and performing a first notification operation in which the notification part is caused to notify that the leading end has been detected by the first detection part when the leading end has been detected by the first detection part.

According to this aspect, the first detection part that detects the leading end of the recording medium in the transport direction is included, whether or not the leading end is detected by the first detection part is monitored by the first monitoring operation in the state in which the nipping by the pair of transport rollers is released, and when the leading end has been detected by the first detection part, the notification part is caused to notify that the leading end has been detected by the first detection part. Thus, while the user is on the set position side of the roll body, the skew removal can be performed by feeding the recording medium by an appropriate length in the state in which nipping is released, and thus, it is possible to easily and highly accurately remove the skew without damaging the recording medium.

Example 1

Hereinafter, embodiments of the present disclosure will be described in detail with reference to the accompanying drawings. First, an outline of a recording device 1 according to Example 1 of the present disclosure will be described with reference to FIG. 1. In FIG. 1, some component elements are omitted for clarity of configuration. Here, in the drawings, an X-axis direction is a horizontal direction and is a direction in which a rotary shaft of a holding part 3 that holds a roll body R1 in which a recording medium M is wound in a roll shape extends, a Y-axis direction is a horizontal direction and a forward and rearward direction of a recording device 1, and is a direction perpendicular to the X-axis direction, and a Z-axis direction is a vertical direction. Additionally, hereinafter, an arrow direction is a + direction, and a direction opposite to the arrow direction is a − direction. For example, a vertically upward direction is a +Z direction, a vertically downward direction is a −Z direction, the front of the recording device 1 is a +Y direction, and the rear of the recording device 1 is a −Y direction.

The recording device 1 according to the example includes a main body part 2, and includes a holding part 3 that holds a roll body R1 in which the recording medium M is wound into a roll shape on the −Y direction side, which is the rear side of the main body part 2. In the recording device 1 according to the example, when the recording medium M is transported in a transport direction A, the holding part 3 having a rotary shaft in the X-axis direction rotates in a rotation direction C. In the example, although the roll body R1 wound so that a recording surface on which recording is performed faces outward is used, when the roll body R1 in which the recording surface faces inward is used, the holding part 3 can rotate in a direction opposite to the rotation direction C to feed the recording medium M from the roll body R1.

The recording device 1 according to the example includes a transport route for the medium M, which includes a medium support part 4, a medium support part 10, a medium support part 11, and the like that support the recording medium M. Further, the recording device 1 includes a pair of transport rollers 7 including a driving roller 5 and a driven roller 6 for transporting the recording medium M in the transport direction A in the transport route In the recording device 1 according to the example, the driving roller 5 is configured of a roller that extends in a width direction B that intersects the transport direction A, and a plurality of driven rollers 6 are provided side by side in the width direction B with respect to the driving roller 5 at positions facing the driving roller 5. However, a configuration of the pair of transport rollers 7 is not particularly limited as long as they can nip and transport the recording medium M.

The recording device 1 according to the example includes a head 8 as a recording part that includes a plurality of nozzles at positions facing the medium support part 10 and discharges ink from the nozzles for recording, and a carriage 9 that can reciprocate in the width direction B in a state in which the head 8 is mounted thereon. In the recording device 1 according to the example, the transport direction A at the position facing the head 8 on the medium support part 10 is the +Y direction, the width direction B that is a movement direction of the head 8 is a direction along the X-axis direction, and a discharge direction of the ink is the −Z direction.

With the configuration described above, the head 8 can discharge ink from the nozzles (not shown) onto the transported recording medium M to perform recording while reciprocating in the width direction B that intersects the transport direction A. The recording device 1 according to the example can form a desired image on the recording medium M by repeating transporting of the recording medium M in the transport direction A by a predetermined transporting amount and discharging of ink while the head 8 is moved in the width direction B in a state in which the recording medium M is stopped However, instead of the head having such a configuration, a configuration including a so-called line head in which nozzles for discharging ink are provided over the entire X-axis direction may be used.

Additionally, a heating part 14 is provided at a position facing the medium support part 11. Here, the heating part 14 of the example is an infrared heater 14A that emits infrared light in a heating range R1 of the medium support part 11. However, a configuration of the heating part 14 is not limited particularly.

A first detection part 12 (a first detection part 12A) that can detect a leading end of the recording medium M in the transport direction A is provided on the downstream side of the heating range R1 of the medium support part 11 in the transport direction A. Further, a second detection part 13 that can detect the leading end of the recording medium M in the transport direction A is provided on the upstream side of the heating range R1 of the medium support part 11 in the transport direction A. Here, in the medium support part 11, a groove 11A is provided between the heating range R1 and the second detection part 13 so that heat from the heating part 14 is not transferred to the second detection part 13, and similarly, a groove 11B is provided between the heating range R1 and the first detection part 12 so that heat from the heating part 14 is not transferred to the first detection part 12.

In addition, a guide bar 15 having a contact portion with the recording medium M that extends in the width direction B and capable of applying a desired tension to the recording medium M is provided on the downstream side of the medium support part 11 in the transport direction A. However, a configuration without the guide bar 15 may be employed. The recording device 1 according to the example has a configuration as illustrated in FIG. 1, but is not limited to such a configuration.

Furthermore, a winding shaft 16 on which the recording medium M transported in the transport direction A is wound in a roll shape to form a roll body R2 is provided on the downstream side of the guide bar 15 in the transport direction A. In the recording device 1 according to the example, the holding part 3 and the winding shaft 16 have the same configuration, and are configured to support a paper tube that is a center of rotation of the roll body R1 and the roll body R2 and to rotate the paper tube in the rotation direction C.

Figure 2:
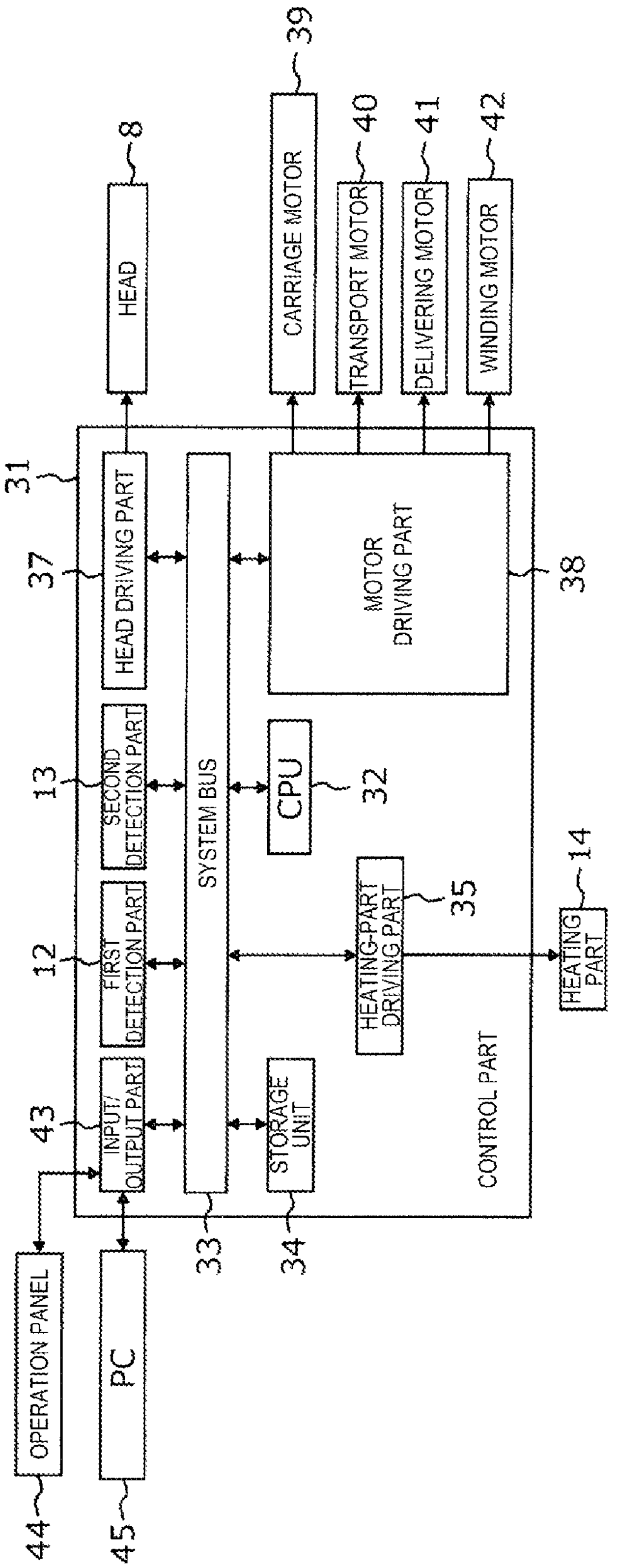
FIG. 2 is a block diagram illustrating the recording device according to Example 1.

Next, an electrical configuration of the recording device 1 according to the example will be described. FIG. 2 is a block diagram illustrating the electrical configuration of the recording device 1 according to the example. A control part 31 includes a CPU 32 that controls the entire recording device 1. The CPU 32 is coupled to a storage part 34 via a system bus 33. The storage part 34 includes a ROM that stores various control programs executed by the CPU 32, a RAM that can temporarily store data, and an EEPROM that is a non-volatile memory capable of storing rewritten data.

Here, the CPU 32 is coupled through the system bus 33 to the first detection part 12 for detecting the leading end of the recording medium M in the transport direction A. Additionally, the CPU 32 is coupled through the system bus 33 to the second detection part 13 that detects the leading end of the recording medium M in the transport direction A. In addition, the CPU 32 is coupled through the system bus 33 to a head driving part 37 that drives the head 8.

Furthermore, the CPU 32 is coupled through the system bus 33 to a motor driving part 38 that is coupled to a carriage motor 39, a transport motor 40, a feeding motor 41, and a winding motor 42. Here, the carriage motor 39 is a motor for moving, in the width direction B, the carriage 9 on which the head 8 is mounted. In addition, the transport motor 40 is a motor for driving the driving roller 5 that constitutes the pair of transport rollers 7. Moreover, the feeding motor 41 is a rotation mechanism for the holding part 3, and is a motor for driving the holding part 3 to feed the recording medium M to the pair of transport rollers 7. Also, the winding motor 22 is a driving motor for rotating the winding shaft 16.

Further, the CPU 32 is coupled through the system bus 33 to a heating part driving part 35 that drives the heating part 14. Furthermore, the CPU 32 is coupled through the system bus 33 to an input/output part 43. The input/output part 43 is coupled to an operation panel 44 including a monitor capable of notifying information to a user and a button that receives an instruction input from the user, and a PC 45 for transmitting and receiving data, such as recording data, and a signal.

The control part 31 of the example is configured to control the head 8, the driving roller 5, the carriage 9, and the heating part 14. Additionally, due to the control part 31 controlling the head 8, the driving roller 5, the carriage 9, the heating part 14, and the like, the recording device 1 of the example can perform a recording operation. Specifically, the recording medium M can be transported by a predetermined amount by the pair of transport rollers 7 while the recording medium M is fed from the holding part 3 and wound by the winding shaft 16, and ink can be discharged from the head 8 while the head 8 is moved in the width direction B, and also the recording operation can be performed while the ink discharged from the head 8 onto the recording medium M is heated and dried by the heating part 14.

Figure 3:
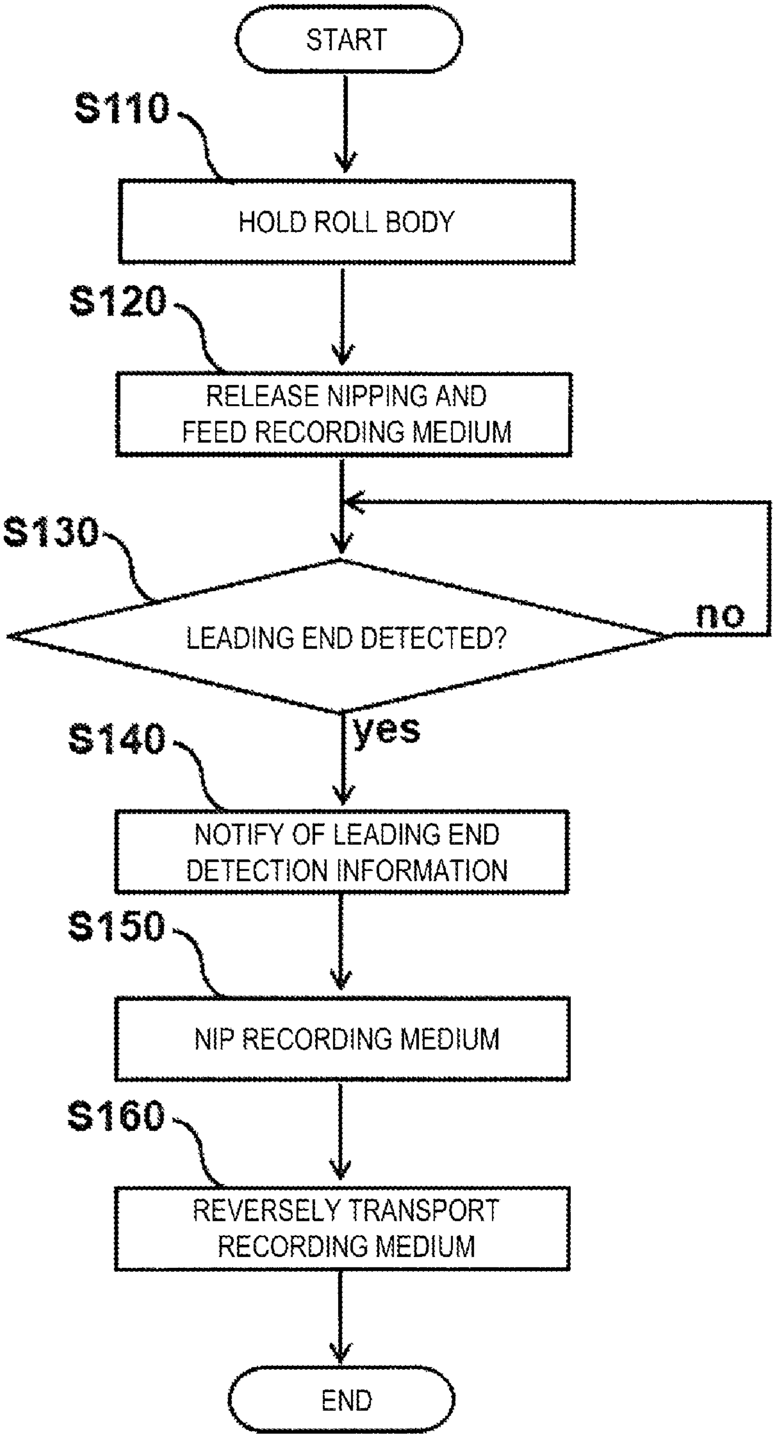
FIG. 3 is a flowchart as an example of a control method for the recording device of Example 1.

Next, an example of a control method for a recording device that can be performed using the recording device 1 with reference to the flowchart of FIG. 3, specifically, a method of setting the roll body R1 to the recording device 1 until recording can start will be described. Before the control method for the recording device according to the example is described, a control method for the recording device according to a reference example will be described with reference to FIG. 5 to FIG. 7.

First, a control method for the recording device according to Reference Example 1 represented by a flowchart of FIG. 5 will be described. In the control method for the recording device according to Reference Example 1, first, the roll body R1 is held by the holding part 3 in Step S110. Next, in Step S120, the recording medium M is fed from the roll body R1 in the transport direction A in a state in which nipping by the pair of transport rollers 7 is manually released by the user. Next, in Step S210, when the leading end of the recording medium M in the transport direction A passes a nipping position of the pair of transport rollers 7, the pair of transport rollers 7 nips the recording medium M. Until now, the user performs a work behind the recording device 1.

Then, in Step S220, the user moves forward of the recording device 1. Then, in Step S230, the user releases nipping by the pair of transport rollers 7 while holding the recording medium M. Next, in Step S240, when the recording medium M is drawn forward and it is determined that the user has drawn the recording medium M forward by a predetermined amount, the recording medium M is nipped by the pair of transport rollers 7 in Step S250.

Then, in Step S260, the user moves to the rear of the recording device 1. Then, in Step S270, the user winds the recording medium M by releasing nipping by the pair of transport rollers 7 and winding the recording medium M around the roll body R1 by a predetermined amount. When it is determined that a predetermined amount of the recording medium M is wound by the user, in Step S280, the recording medium M is nipped by the pair of transport rollers 7, and the control method for the recording device according to Reference Example 1 represented by the flowchart of FIG. 5 is ended. In this way, in the control method for the recording device according to Reference Example 1 represented by the flowchart of FIG. 5, the user repeatedly moves forward and rearward of the recording device 1. In other words, the control method for the recording device according to Reference Example 1 represented by the flowchart of FIG. 5 is a task having a large burden on a user.

Next, a control method for the recording device according to Reference Example 2 represented by a flowchart of FIG. 6 will be described. In the control method for the recording device according to Reference Example 2, Step S110, Step S120 and Step S210 are similar to those in the control method for the recording device according to Reference Example 1. After Step S210 is performed, an automatic skew removal is performed in Step S310. In the automatic skew removal, in a state in which the recording medium M is nipped by the pair of transport rollers 7, the transport of the recording medium M and the feeding by the holding part 3, and the reverse transport of the recording medium M and the winding by the holding part 3 are repeated. The "reverse transport" means to move the recording medium M in a direction opposite to the transport direction A.

As described above, the automatic skew removal is performed in the state in which the recording medium M is nipped by the pair of transport rollers 7. When the transport and the reverse transport of the recording medium M are repeated in a state in which the recording medium M is nipped by the pair of transport rollers 7, the recording medium M may be damaged by a nipping pressure of the pair of transport rollers 7 and the like.

Next, a control method for the recording device according to Reference Example 3 represented by a flowchart of FIG. 7 will be described. In the control method for the recording device according to Reference Example 3, Step S110 and Step S120 are similar to those in the control method for the recording device according to Reference Example 1 and Reference Example 2. After Step S120 is performed, the recording medium M is wound around the roll body R1 in Step S410, and the recording medium is nipped in Step S420. Step S410 is the same as Step S270 in the control method for the recording device according to Reference Example 1, and Step S420 is the same as Step S280 in the control method for the recording device according to Reference Example 1.

Here, after Step S120 is performed, a feeding amount of the recording medium M until Step S410 starts is an arbitrary feeding amount by the user. Since the user feeds the recording medium M from the rear to the front of the recording device 1, it is difficult for the user to grasp the feeding amount. When the feeding amount of the recording medium M is too large, the recording medium M may come into contact with an installation surface of the recording device 1 in front of the recording device 1 and may be damaged. On the other hand, when the feeding amount of the recording medium M is too small, an amount of the reverse transport of the recording medium M to the roll body R1 in Step S410 may be too small, and accuracy of the skew removal may be reduced.

Figure 5:
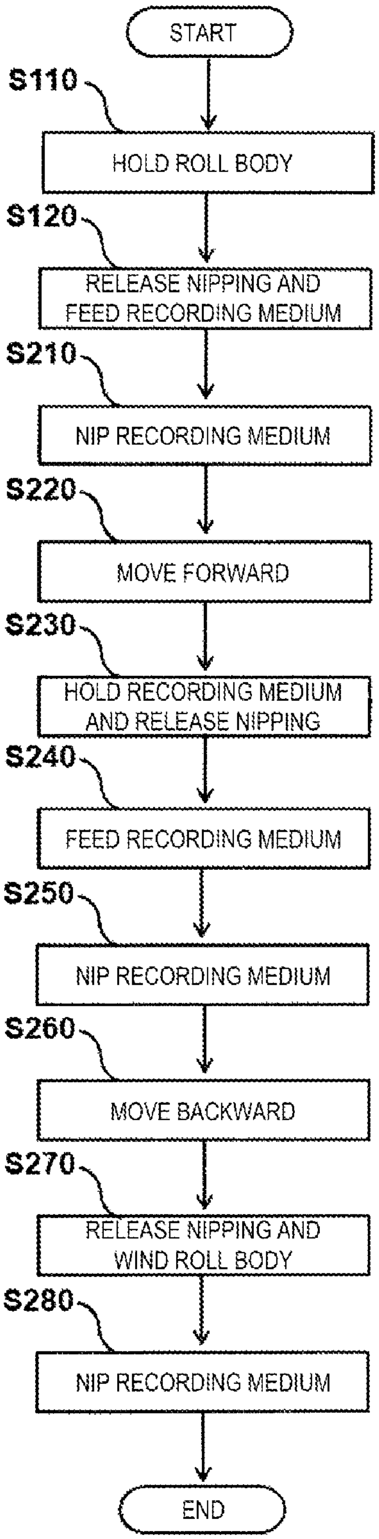
FIG. 5 is a flowchart as an example of a control method for the recording device according to Reference Example 1.
Figure 6:
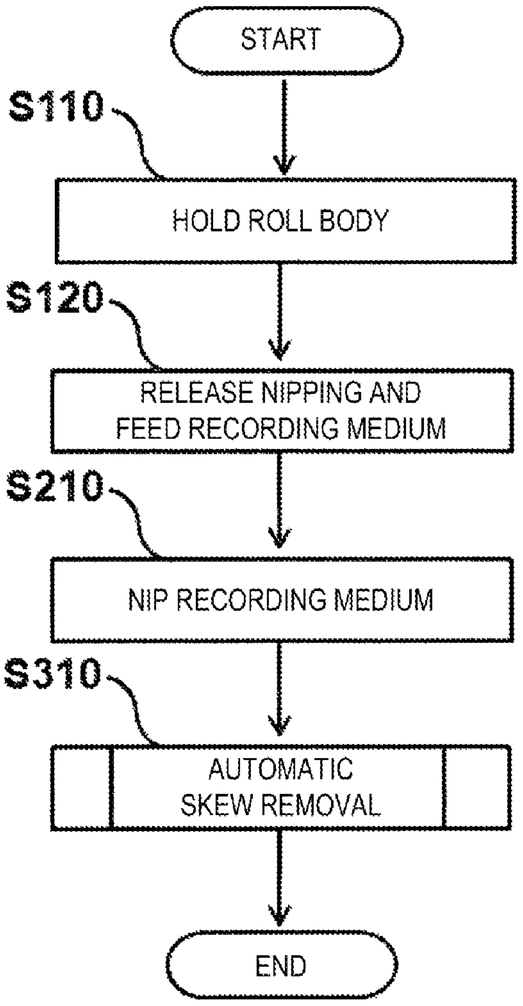
FIG. 6 is a flowchart as an example of a control method for the recording device according to Reference Example 2.
Figure 7:
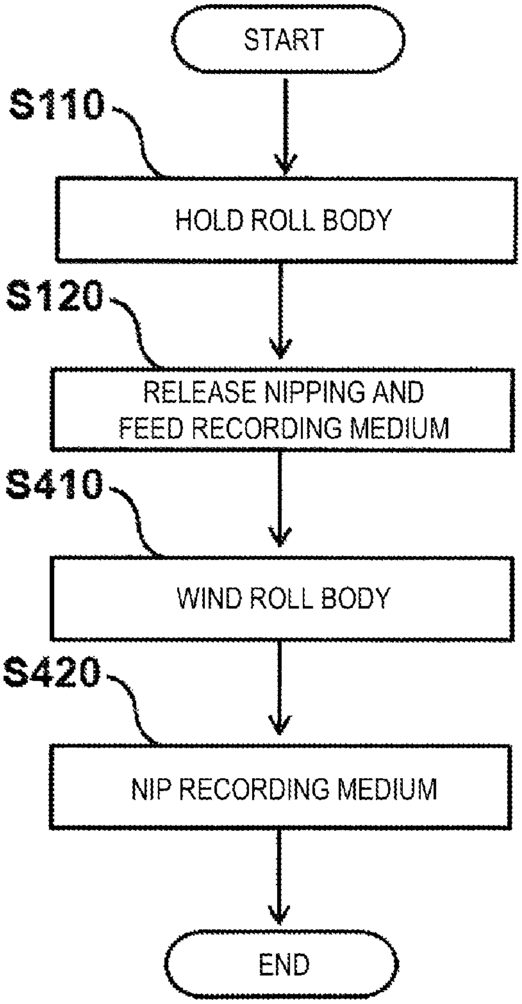
FIG. 7 is a flowchart as an example of a control method for the recording device according to Reference Example 3.

As described above, in all the control methods of the recording device according to the reference examples represented by the flowcharts of FIGS. 5 to 7, it is difficult to easily remove the skew with high accuracy without damaging the recording medium M. Next, the control method for the recording device according to the example represented by the flowchart of FIG. 3 will be described.

In the control method for the recording device according to the example, Step S110 and Step S120 are similar to those in the control methods for the recording device according to Reference Examples 1 to 3. After Step S120 is performed, in Step S130, the control part 31 determines whether or not the leading end of the medium M in the transport direction A is detected by the first detection part 12. In other words, Step S130 is repeated until the leading end of the medium M in the transport direction A is detected by the first detection part 12, and the process proceeds to Step S140 when the leading end of the medium M in the transport direction A is detected by the first detection part 12.

In Step S140, the control of the control part 31 causes a buzzer sound to be generated in a buzzer (not illustrated), and displays that the leading end of the medium M in the transport direction A is detected by the first detection part 12 on a monitor of the operation panel 44. In the example, although notification of medium detection information is performed by generating a buzzer sound and displaying on a monitor of the operation panel 44 that the leading end of the medium M in the transport direction A is detected by the first detection part 12, the present disclosure is not limited to such a notification method, and for example, a buzzer sound may be generated, or a light (not shown) may be illuminated.

Next, in Step S150, the recording medium M is nipped by the pair of transport rollers 7. Then, in Step S160, under the control of the control part 31, the recording medium M is reversely transported until the leading end of the medium M in the transport direction A is detected by the second detection part 13, and the control method for the recording device according to the example is ended.

As described above, the control method for the recording device according to the example a control method for a recording device including the holding part 3 that holds the roll body in which the recording medium M is wound in a roll shape, the feeding motor 41 which is a rotation mechanism that rotates the roll body R1 by rotating the holding part 3, the pair of transport rollers 7 that transports the recording medium M by nipping the recording medium and being rotated, the head 8 that performs recording on the recording medium M transported by the pair of transport rollers 7, the first detection part 12 that is disposed downstream from the head 8 in the transport direction A and detects the leading end of the recording medium M in the transport direction A, and the operation panel 44 as a notification part that notifies information. Then, in the state in which nipping by the pair of transport rollers 7 is released, whether or not the leading end of the recording medium M is detected by the first detection part 12 is monitored by the first monitoring operation in Step S130, and when the leading end has been detected by the first detection part 12, the first notification operation in Step S140 in which the notification part is caused to notify that the leading end of the recording medium M has been detected by the first detection part 12 is performed.

When the above is explained from the viewpoint of the recording device 1, the recording device 1 according to the example includes the control part 31 that controls the feeding motor 41, the pair of transport rollers 7, the head 8, the first detection part 12, and the operation panel 44, the control part 31 monitors whether or not the leading end of the recording medium M is detected by the first detection part 12 with the first monitoring operation in the state in which nipping by the pair of transport rollers 7 is released, and performs the first notification operation in which the operation panel 44 is caused to notify that the leading end of the recording medium M has been detected by the first detection part 12 when the leading end of the recording medium M has been detected by the first detection part 12.

Since the recording device 1 according to the example can perform the control method for the recording device described above, for example, the user can feed the recording medium M from the set position side (the rear side: the −Y direction side) of the roll body R1 in the state in which nipping by the pair of transport rollers 7 is released, then can stop the feeding of the recording medium M at an exact position at which the leading end of the recording medium M reaches the first detection part 12 by the notification from the operation panel 44, and thus can nip the recording medium M with the pair of transport rollers 7 while standing on the set position side of the roll body R1. When a feeding length of the recording medium M is too long, the recording medium M may be damaged due to contact with the installation surface of the recording device 1 or the like. In addition, when the feeding length of the recording medium M is too short, the skew removal accuracy may decrease. This is because the skew removal at the time of setting the roller body R1 is performed by rewinding the recording medium M that has been fed once and winding the recording medium M around the roll body R1, but when a rewinding distance is too short, the skew removal may be insufficient. Furthermore, even when the recording medium M is repeatedly transported and reversely transported in the state in which the recording medium M is nipped by the pair of transport rollers 7, the recording medium M may be damaged. Thus, when the control method for the recording device described above is performed, while the user is on the set position side of the roll body R1, the skew removal can be performed by feeding the recording medium M by an appropriate length in the state in which nipping is released, and thus the skew removal can be performed easily and with high accuracy without damaging the recording medium M.

Further, in the recording device 1 according to the example, in Step S160, the control part 31 can control the feeding motor 41 so that the recording medium M is wound around the roll body in response to receiving an input of the reverse transport operation, in which the recording medium M is reversely transported in the direction opposite to the transport direction A, from the operation panel 44 that can receive an input of an operation from the user, after the first notification operation in Step S140 is performed. Thus, the recording device 1 according to the example can perform the skew removal in response to receiving the input of the reverse transport operation by the user.

Additionally, the recording device 1 according to the example includes the second detection part 13 that detects the leading end of the recording medium M between the head 8 and the first detection part 12, and the control part 31 monitors in Step S160 whether or not the leading end of the recording medium M is detected by the second detection part 13 with the second monitoring operation, and ends the reverse transport and the winding of the recording medium M around the roll body R1, when the leading end of the recording medium M is detected by the second detection part 13. Therefore, the recording device 1 of the example can arrange the recording medium M in which the skew is removed at an appropriate position, and can immediately start recording from a desired position on the recording medium M, for example.

Further, the control part 31 can perform a second notification operation in which the operation panel 44 is caused to notify that the leading end of the recording medium M has been detected by the second detection part 13 when the leading end of the recording medium M has been detected by the second detection part 13 in the second monitoring operation in Step S160. Therefore, when the recording device 1 according to the example is used, the user can quickly recognize that the recording medium M is disposed at an appropriate position.

In addition, after the second notification operation is performed, the control part 31 can perform a third notification operation in which the operation panel 44 or the like is caused to notify prompting to nip the recording medium M with the pair of the transport rollers 7 and to start recording. Therefore, when the recording device 1 according to the example is used, the user can quickly start recording.

In addition, the recording device 1 according to the example has a nip monitoring mechanism that monitors a nipping state of the pair of transport rollers 7, and the control part 31 can control the operation panel 44 so as not to receive an input of the operation instruction for starting recording from the user until the recording medium M is nipped by the pair of transport rollers 7 in a case in which the recording medium M is not nipped by the pair of transport rollers 7 when recording starts after the reverse transport of the recording medium M in Step S160 based on the monitoring result of the nip monitoring mechanism, Therefore, when the recording device 1 according to the example is used, it is possible to suppress the start of recording in a state in which the recording medium M is not nipped and the recording medium M is not properly transported.

In addition, in the case in which the recording medium M is not nipped by the pair of transport rollers 7 when recording starts after the reverse transport of the recording medium M in Step S160, the control part 31 can cause the operation panel 44 to notify prompting to nip the recording medium M with the pair of transport rollers 7. Thus, when the recording device 1 according to the example is used, the user can quickly recognize that the recording medium M is not nipped by the pair of transport rollers 7 and the recording cannot start.

Further, as described above, the recording device 1 according to the example includes the heating part 14 that is provided downstream from the head 8 in the transport direction A and heats the transported recording medium M, and the first detection part 12 is provided at a position different from the heated region R1 of the recording medium M heated by the heating part 14 in the transport direction A. Therefore, in the recording device 1 according to the example, it can be suppressed that the first detection part 12 is heated by the heating part 14 and is damaged. In the example, not only the first detection part 12, but also the second detection part 13 are provided at positions different from the heated region R1 of the recording medium M heated by the heating part 14. Therefore, in the recording device 1 according to the example, it can also be suppressed that the second detection part 13 is heated by the heating part 14 and is damaged.

Example 2

Figure 4:
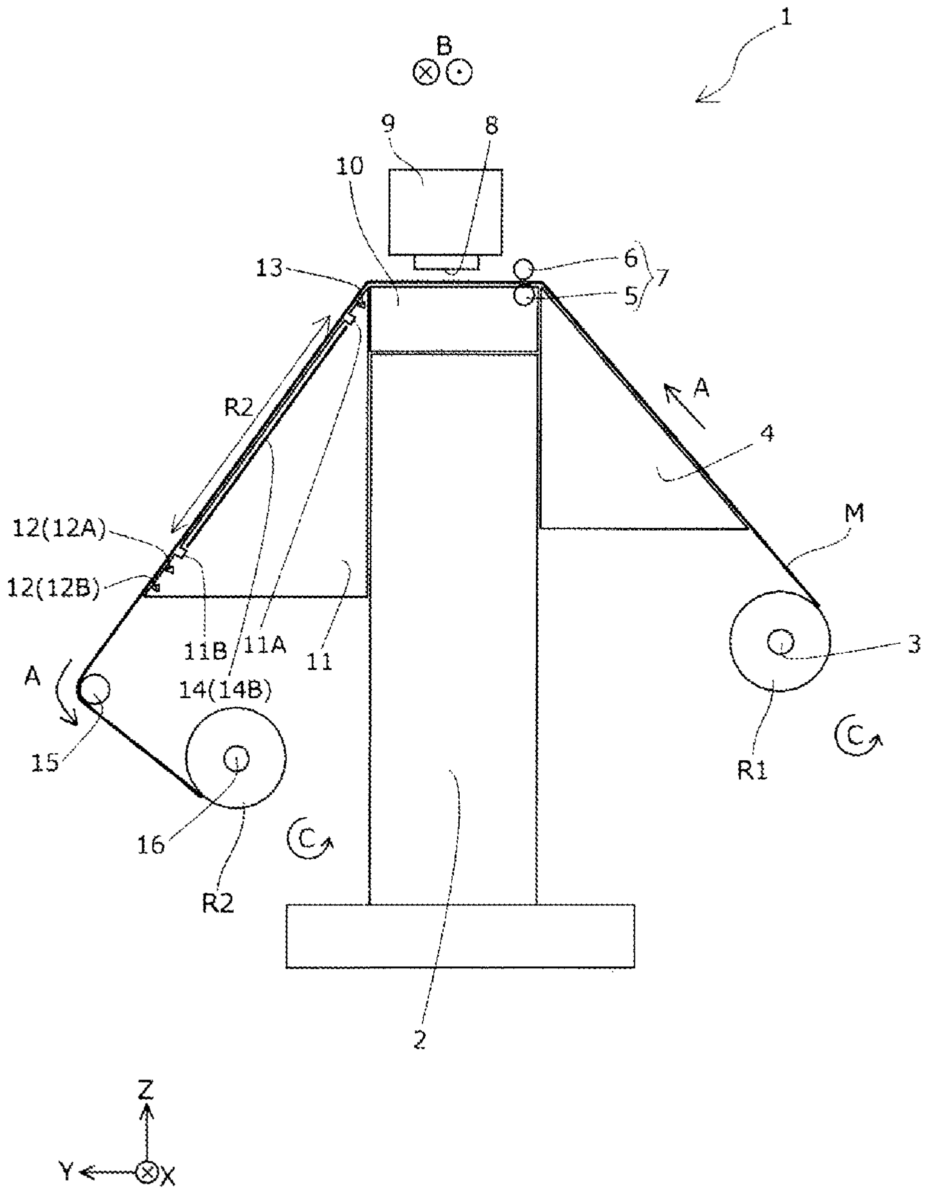
FIG. 4 is a schematic side view of a recording device according to Example 2 of the present disclosure.

First, the recording device 1 according to Example 2 will be described with reference to FIG. 4. FIG. 4 is a diagram corresponding to FIG. 1 in the recording device 1 of Example 1. In addition, the recording device 1 according to the example has the same configuration as the recording device 1 of Example 1 except the configuration described below, and thus has the same features as in the recording device 1 of Example 1. Therefore, in FIG. 1, the constituent members common to those in Example 1 are designated by the same reference numerals, and detailed description thereof will be omitted.

As illustrated in FIG. 1, the recording device 1 of Example 1 includes the infrared heater 14A as the heating part 14, and includes one first detection part 12A as the first detection part 12 at a position different from the heating region R1 of the infrared heater 14A. On the other hand, as illustrated in FIG. 4, the recording device 1 according to the example includes a nichrome wire heater 14B as the heating part 14, and includes two first detection part 12A and first detection part 12B as the first detection part 12 at positions different from a heating region R2 of the nichrome wire heater 14B.

Thus, the recording device 1 according to the example includes a plurality of first detection parts 12 in the transport direction A. The recording device 1 according to the example can receive an input by the user such as the type and width of the recording medium M used through the operation panel 44. Thus, the control part 31 of the recording device 1 according to the example can employ a detection result of the first detection part 12 at an appropriate position according to the ease of skew correction derived from the type, width, and the like of the recording medium M used, for example. Thus, the recording device 1 according to the example can remove the skew particularly with high accuracy.

The present disclosure is not limited to the examples described above, and can be realized in various configurations without departing from the gist of the present disclosure. For example, a position of the leading end of the recording medium M may be grasped by providing an encoder in the holding part 3 or the like and using the reading result of the encoder and data such as a roll diameter of the roll body R1 instead of the detection result of the first detection part 12. Appropriate replacements or combinations may be made to the technical features in the examples which correspond to the technical features in the aspects described in the summary section to solve some or all of the problems described above or to achieve some or all of the advantageous effects described above. Additionally, when the technical features are not described herein as essential technical features, such technical features may be deleted appropriately.

What is claimed is:

1. A recording device comprising:

a holding part configured to hold a roll body in which a recording medium is wound into a roll shape;

a rotation mechanism configured to rotate the roll body by rotating the holding part;

a pair of transport rollers configured to transport the recording medium by nipping and rotating the recording medium;

a recording part configured to perform recording on the recording medium transported by the pair of transport rollers;

a first detection part disposed downstream of the recording part in a transport direction of the recording medium, and configured to detect a leading end of the recording medium in the transport direction;

a notification part configured to notify information;

an operation part configured to receive an input of an operation;

a second detection part configured to detect the leading end between the recording part and the first detection part; and a control part configured to control the rotation mechanism, the pair of transport rollers, the recording part, the first detection part, and the notification part, wherein in a state in which nipping by the pair of transport rollers is released, the control part monitors in a first monitoring operation whether or not the leading end inserted in the transport direction from a holding part side into a space between the pair of transport rollers is detected by the first detection part, and when the leading end is detected by the first detection part, the control part performs a first notification operation of causing the notification part to notify that the leading end is detected by the first detection part, after performing the first notification operation, the control part controls the rotation mechanism to wind the recording medium around the roll body in response to receiving, from the operation part, an input of a reverse transport operation of reversely transporting the recording medium in a direction opposite to the transport direction, and the control part monitors in a second monitoring operation whether or not the leading end is detected by the second detection part, and when the leading end is detected by the second detection part, the control part ends the reverse transport and the winding of the recording medium around the roll body.

2. The recording device according to claim 1, wherein when the leading end is detected by the second detection part in the second monitoring operation, the control part performs a second notification operation of causing the notification part to notify that the leading end is detected by the second detection part.

3. The recording device according to claim 2, wherein after performing the second notification operation, the control part performs a third notification operation of causing the notification part to perform a notification for prompting to nip the recording medium by the pair of the transport rollers and to start recording.

4. The recording device according to claim 1, wherein a plurality of the first detection parts are provided in the transport direction, and the control part determines a first detection part to be used from among the plurality of first detection parts, according to a type of the recording medium.

5. The recording device according to claim 1, comprising a heating part disposed downstream of the recording part in the transport direction and configured to heat the recording medium transported, wherein the first detection part is disposed at a position different from a heated region of the recording medium heated by the heating part, in the transport direction.

6. A recording device comprising:

a holding part configured to hold a roll body in which a recording medium is wound into a roll shape;

a rotation mechanism configured to rotate the roll body by rotating the holding part;

a pair of transport rollers configured to transport the recording medium by nipping and rotating the recording medium;

a recording part configured to perform recording on the recording medium transported by the pair of transport rollers;

first detection part disposed downstream of the recording part in a transport direction of the recording medium, and configured to detect a leading end of the recording medium in the transport direction;

a notification part configured to notify information;

an operation part configured to receive an input of an operation; and a control part configured to control the rotation mechanism, the pair of transport rollers, the recording part, the first detection part, and the notification part, wherein in a state in which nipping by the pair of transport rollers is released, the control part monitors in a first monitoring operation whether or not the leading end inserted in the transport direction from a holding part side into a space between the pair of transport rollers is detected by the first detection part, and when the leading end is detected by the first detection part, the control part performs a first notification operation of causing the notification part to notify that the leading end is detected by the first detection part, after performing the first notification operation, the control part controls the rotation mechanism wo wind the recording medium around the roll body in response to receiving, from the operation part, an input of a reverse transport operation of reversely sporting the recording medium in a direction opposite to the transport direction, and when recording is started after reversely transporting the recording medium, in a case in which the recording medium is not nipped by the pair of transport rollers, the control part controls the operation part so as not to receive an input of an operation instruction for starting recording until the recording medium is nipped by the pair of transport rollers.

7. The recording device according to claim 6, wherein when recording is started after reversely transporting the recording medium, in the case in which the recording medium is not nipped by the pair of transport rollers, the control part performs a fourth notification operation of causing the notification part to perform a notification for prompting to nip the recording medium by the pair of transport rollers.

8. A control method for a recording device that includes, a holding part configured to hold a roll body in which a recording medium is wound into a roll shape, a rotation mechanism configured to rotate the roll body by rotating the holding part, a pair of transport rollers configured to transport the recording medium by nipping and rotating the recording medium, a recording part configured to perform recording on the recording medium transported by the pair of transport rollers, a first detection part disposed downstream of the recording part in a transport direction of the recording medium, and configured to detect a leading end of the recording medium in the transport direction, a notification part configured to notify information, an operation part configured to receive an input of an operation, and a second detection part configured to detect the leading end between the recording part and the first detection part, the method comprising:

in a state in which nipping by the pair of transport rollers is released, monitoring in a first monitoring operation whether or not the leading end inserted in the transport direction from a holding part side into a space between the pair of transport rollers is detected by the first detection part;

when the leading end is detected by the first detection part, performing a first notification operation of causing the notification part to notify that the leading end is detected by the first detection part;

controlling the rotation mechanism to wind the recording medium around the roll body in response to receiving, from the operation part, an input of a reverse transport operation of reversely transporting the recording medium in a direction opposite to the transport direction; and monitoring in a second monitoring operation whether or not the leading end is detected by the second detection part, and when the leading end is detected by the second detection part, ending the reverse transport and the winding of the recording medium around the roll body.

* * * * *